United States Patent [19]

Skaria et al.

[11] 4,248,849

[45] Feb. 3, 1981

[54] PROCESS FOR THE CONTINUOUS DEHYDRATION AND CALCINATION OF HYDRATED ALUMINUM FLUORIDE FOR THE MANUFACTURE OF HIGH PURITY ALUMINUM FLUORIDE

[75] Inventors: Arankathu Skaria, Stäfa; Reiner Stark, Fällanden, both of Switzerland

[73] Assignee: Swiss Aluminium Ltd., Chippis, Switzerland

[21] Appl. No.: 81,342

[22] Filed: Oct. 3, 1979

[30] Foreign Application Priority Data

Oct. 9, 1978 [CH] Switzerland ............... 10457/78

[51] Int. Cl.$^3$ ............................................... C01F 7/50
[52] U.S. Cl. ................................................. 423/489
[58] Field of Search .................................... 423/489

[56] References Cited

U.S. PATENT DOCUMENTS 3,057,681  10/1962  Gernes ........................... 423/489
3,606,283  9/1971   Weber ............................ 423/489

FOREIGN PATENT DOCUMENTS 911837 11/1962 United Kingdom ............... 423/489

Primary Examiner—Brian E. Hearn
Attorney, Agent, or Firm—Bachman and LaPointe

[57] ABSTRACT

The invention relates to a continuous, two-stage process for complete dehydration and subsequent calcination of aluminum fluoride hydrates.

The known processes used for this purpose are satisfactory for producing relatively small quantities of aluminum fluoride. In the production of larger quantities of aluminum fluoride however several problems arise with respect to trouble free control and supervision of the process and maintainance of the equipment.

The disadvantages which up to now have been mainly due to the process itself are removed by the combination of the following process steps:
  (a) Dehydrating the aluminum fluoride hydrate in a first step, to produce aluminum semi-hydrate $AlF_3.0.5H_2O$ by means of a generally known method
  (b) heating the aluminum semi-hydrate in a second stage in an indirectly heated, horizontal rotary kiln to remove the remaining water of crystallization, and then calcining at ca. 500°–600° C.

3 Claims, No Drawings

PROCESS FOR THE CONTINUOUS DEHYDRATION AND CALCINATION OF HYDRATED ALUMINUM FLUORIDE FOR THE MANUFACTURE OF HIGH PURITY ALUMINUM FLUORIDE

BACKGROUND OF THE INVENTION

The present invention relates to a continuous, two-stage process for complete dehydration and subsequent calcination of aluminum fluoride hydrates (e.g. $AlF_3.3H_2O$), to obtain a high yield of a product of especially high purity. The invention relates in particular to a two-stage process in which the second stage comprises the final dehydration of the semi-hydrate ($AlF_3.0.5H_2O$) and its calcination.

On crystallizing $AlF_3$ from an aqueous solution, hydrated forms of this fluoride are obtained, amongst these aluminum fluoride trihydrate.

The dehydration of this hydrate is problematic because, during the heating of the hydrate to the calcination temperature of 550°–600° C., a hydrolysis reaction takes place in contact with the water vapor and, with the formation of HF, $Al_2O_3$ is formed.

$$2AlF_3 + 3H_2O \rightarrow Al_2O_3 + 6HF$$

If aluminum fluoride hydrate is calcined in counter flow in a directly heated, lined rotary furnace, the resultant calcined product contains only 86–92% at max. of $AlF_3$ the remainder being essentially $Al_2O_3$. The German Pat. DE-PS No. 1 166 754 describes a process for the calcination of the $AlF_3$ hydrate in a fluidized bed to give calcined aluminum fluoride, at the same time eliminating the hydrolysis reaction. A special feature of this process is that the hydrate is heated to the calcination temperatures in question in less than one to a few seconds. This causes the water of hydration to be dissociated and removed quickly to avoid re-hydrolisation reactions. In large scale production this process leads to 96% calcined $AlF_3$, and represents therefore a substantial improvement over direct calcination.

The device for carrying out the process of DE-PS No. 1 166 754 for continuous calcination of $AlF_3$ hydrates is described in the patent AT-PS No. 28 533. The apparatus described there functions satisfactorily on a small scale. However, if it is to be applied in large capacity plants, it turns out to be relatively complicated, not always easy to control and requires expensive supervision and maintainance. There was therefore a great need to find a solution which is simpler from the technical viewpoint.

The Swiss Pat. CH-PS No. 580 033 has therefore already described a device for the calcination of $AlF_3$ tri-hydrate to the semi-hydrate which calcine $AlF_3$ hydrate to $AlF_3$ semi-hydrate at calcination temperatures of 190°–200° C. on a large scale in a plate type dryer. Using this calcination temperature and a subsequent final calcination in a fluidized bed, calcined $AlF_3$ with an $AlF_3$ content of 96% is also obtained. It is however a disadvantage that in this case too the final calcination temperature for the $AlF_3$ must be reached within a few seconds.

From the state of the art it can be seen that relatively complex processes and/or devices have been employed to solve the problems arising from the dehydration of $AlF_3$ hydrates.

The object of the invention is therefore to simplify the process and, without reducing the yield and sacrificing the high purity of the product, at the same time improving the reliability of the operation.

SUMMARY OF THE INVENTION

The process of the present invention is a two stage process for complete dehydration and calcination of $AlF_3$ hydrates, and is characterized by way of the combination of the following steps:

(a) dehydrating the aluminum fluoride hydrate in a first step to produce aluminum semi-hydrate $AlF_3.0.5H_2O$, by means of a generally known method (b) heating the aluminum semi-hydrate in a second stage in an indirectly heated, horizontal rotary kiln to remove the remaining water of crystallization, and then calcining at ca 500°–600° C.

DETAILED DESCRIPTION

As was mentioned, dehydration of the $AlF_3$ hydrate in two stages is already known: the first to produce a product which has approx the formula $AlF_3.0.5H_2O$ and the second to achieve complete dehydration.

The dehydration to $AlF_3.0.5H_2O$ can be carried out by another known process e.g. by means of a plate type dryer as described in the Swiss Pat. CH-PS No. 580 033.

It was found, surprisingly, that for the second dehydration stage it is possible to calcine aluminum fluoride semi-hydrate in an indirectly heated rotary oven which is technically, much simpler to operate, at the same time completely avoiding the undesired hydrolysis reaction, although the heating up of the product requires several minutes. The $AlF_3$ content of the resultant product is at least 96% and is in every respect equivalent to, or better than, that produced by the fluidized bed process.

To prevent hydrolysis, the water vapor must be sucked out of the calcination zone along with the air used for flushing the system. In this connection it was found, surprisingly, that the rate of suction is not at all as critical as in the known process. It is, therefore, possible to reduce to a minimum the air used for flushing which incidentally, can be fed, through the system either in the same or counter current direction as the material being treated. The water content of the air for flushing depends on the humidity of the air and is normally between 0.5 and 1%. The undesirable hydrolysis does not take place in this process, even when the moisture content of the extracted air is as high as 40%.

The improvements achieved by way of the process of the present invention can be summarized as follows:

The calcination equipment used—a generally know, indirectly heated rotary kiln—is a very simple device which is technically well developed for industrial use and, for the application in question, represents an advanced solution especially with respect to feeding, operation and servicing.

Calcination in the rotating, tube-shaped oven, unlike calcination in a fluidized bed, is insensitive to changes in the range of particle sizes in the product to be calcined.

By minimizing the amounts of air used for flushing and the air exhausted the following advantages are achieved:

(a) the loss of product, due to fine $AlF_3$ particles being removed with the exhaust air, is reduced.

(b) reduces HF loading of the environment after the waste gas scrubber.

The calcination process leads to a product of superior purity (greater than 96% $AlF_3$) at a higher degree of calcination (less than 0.5% loss on ignition).

The manner of carrying out the process of the present invention will now be explained in greater detail with the help of the following example.

EXAMPLE

An $AlF_3$ hydrate ($AlF_3.3H_2O$) was partially dehydrated in a plate type drier to the $AlF_3$ semi-hydrate $AlF_3.0.5H_2$/ (CH-PS No. 580 033) in which the residual water content was approx 9.8%.

This aluminum fluoride semi-hydrate was then fed continuously at 100 kg/h into a rotary oven heated indirectly heated by combustion gas and heated to the calcination temperatures of 550° C. within approx 10 min. The total time the aluminum fluoride spent in the calcining drum was 30 min.

The air used for flushing the system was fed countercurrent to the aluminium fluoride and after extraction from the system had a water vapor content of 33.5 wt-% and a temperature of 195° C.

The $AlF_3$ content of the calcined aluminum fluoride was analyzed and found to be 98.2%. The loss on ignition was 0.29%.

What is claimed is:

1. A process for complete dehydration and subsequent calcination of aluminum fluoride hydrates comprising the steps of:
   A. dehydrating the aluminum fluoride hydrate to produce aluminum semi-hydrate $AlF_3.0.5H_2O$;
   B. indirectly slowly heating the aluminum semi-hydrate in a horizontal rotary kiln to a temperature of between 500°–600° C. over a period of about 5 to 15 minutes to remove the remaining water of crystallization; and
   C. calcining the aluminum semi-hydrate at said temperature.

2. A process according to claim 1 wherein the calcination temperature is reached within approximately 5–10 minutes.

3. A process according to claim 1 wherein the total time the aluminum fluoride spends in the rotary kiln is 15 to 45 minutes, preferably 20 to 30 minutes.

* * * * *